United States Patent Office 2,947,548
Patented Aug. 2, 1960

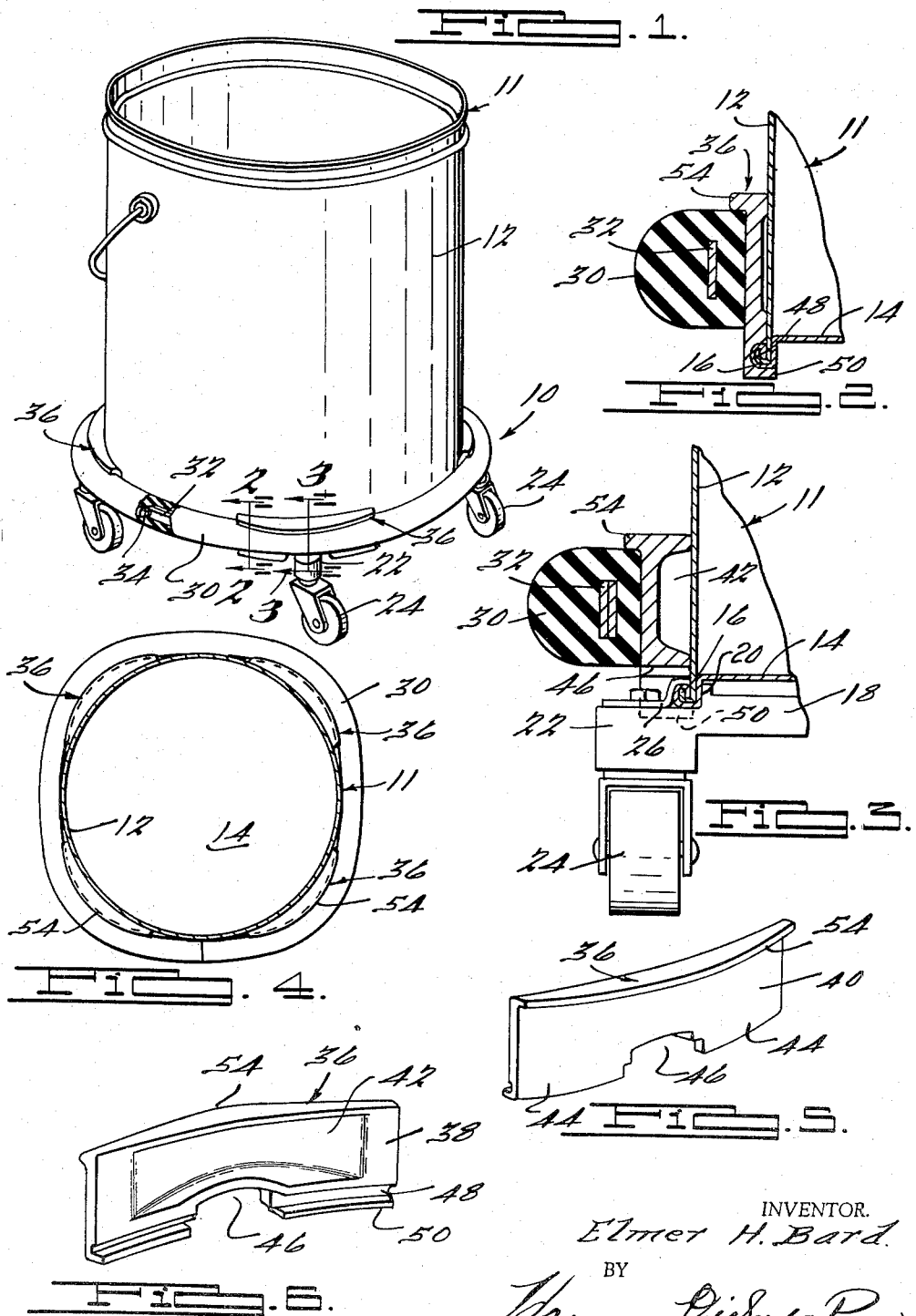

2,947,548

BUMPER ASSEMBLY FOR BUCKETS

Elmer H. Bard, Muskegon, Mich., assignor to Geerpres Wringer, Inc., a corporation of Michigan Filed June 20, 1958, Ser. No. 743,270

3 Claims. (Cl. 280—79.2)

This invention relates generally to wheeled buckets used in floor cleaning operations and the like, and more particularly to a bucket with a resilient bumper assembly.

An object of this invention, therefore, is to provide a wheeled bucket with an improved bumper assembly.

A further object of this invention is to provide a resilient bumper assembly which is readily installed on a wheeled bucket.

A further object of this invention is to provide a bumper assembly for a wheeled bucket which is simple in construction, economical to manufacture and efficient in operation in preventing damage to the bucket or any furniture which it may bump into.

Further objects, features and advantages of this invention will become apparent from a consideration of the following description, the appended claims and the accompanying drawing in which:

Figure 1 is a perspective view of a bucket equipped with the bumper assembly of this invention;

Figs. 2 and 3 are enlarged fragmentary sectional views looking along the lines 2—2 and 3—3, respectively, in Fig. 1;

Fig. 4 is a horizontal sectional view of the bucket and bumper assembly shown in Fig. 1; and Figs. 5 and 6 are perspective views of a bumper supporting bracket used in the bumper assembly of this invention.

With reference to the drawing, the resilient bumper assembly of this invention, indicated generally at 10, is illustrated in Fig. 1 mounted on a bucket 11 having a tubular side wall 12 and a bottom wall 14. The walls 12 and 14 are secured together at a bead 16 which projects outwardly of the side wall 12 and extends around the lower end of the bucket 11 at a position below the bottom wall 14. A bucket supporting frame 18 (Fig. 3), only a portion of which is shown, is disposed below the bottom wall 14 and has four shoulders 20 (only one of which is shown) which engage the inner side of the bead 16. The frame 18 has four projections 22 which extend outwardly of the bucket 11 at a position below the bead 16. Each projection 22 supports a caster wheel 24 and carries a clamping finger 26 which cooperates with the projection 22 to clamp the bead 16 therebetween and insure a positive connection of the bucket 11 to the frame 18.

The bumper assembly 10 consists of an elongated bumper member 30 formed of a strip of rubber or other similar resilient material having a metal strip 32 extending longitudinally therethrough. The bumper member 30 is bent to a closed loop form in which the ends of the metal strip 32 overlap as shown in Figs. 1 and 3. The overlapped metal strip portions are connected by screws or pins such as the one indicated at 34 in Fig. 1 to prevent enlargement or stretching of the rubber bumper member 30 beyond the stretch permitted by the metal strip 32. The strip 32 is of a thin soft metal construction so that some stretching of the bumper 30 is permitted.

Four identical brackets 36 support the bumper member 30 on the lower end of the bucket 12. Each bracket 36 is a unitary casting having a body portion 38 the inner surface of which is curved longitudinally so that it will fit against the bucket side wall 12. The outer surface 40 of the body member 38 has a radius of curvature smaller than the radius of curvature of the inner surface 38 which is provided with a cavity 42 merely to reduce the amount of material required for casting the bracket 36.

The body portion 38 has downwardly extending legs 44 separated by an irregularly shaped opening 46 in the lower side of the bracket 36. Adjacent its lower end, each leg 44 has a groove 48 which extends longitudinally of the bracket 36 and is of a size to have the bead 16 positioned therein when the body portion 38 is placed against the bucket side wall 12. Below the groove 48, each leg 44 is formed with a flange 50 which projects inwardly of the bucket 11 on the underside of the bead 16.

In the assembly of the bumper 30 with the bucket 11 three brackets 36 are assembled with the bucket 11 so that each bracket straddles a frame projection 22, as shown in Figs. 1 and 3. The bumper 30 is then manually positioned about the lower end of the bucket and the three brackets 36 so that it holds the brackets 36 in position on the bucket. A suitable tool (not shown) is then used for moving the bumper 30 away from the portion of the bucket 11 adjacent the fourth projection 22, while the fourth bracket 36 is inserted between the bumper and the bucket in a straddling relation with the fourth projection 22.

Each bracket 36 has a horizontal flange 54 at its upper end which engages the top side of the bumper 30 for locating the bumper in a horizontal position on the bucket 11. In this position, the bumper 30 extends radially outwardly of the bucket beyond any other portions of the bucket or the frame 18. Consequently, the bumper 30 operates to positively prevent any contact of the bucket 11 with furniture, walls or the like, with resultant damage to the furniture and the bucket during floor scrubbing operations.

From the above description, it is seen that the brackets 36 are of a particular shape for assembly with the bucket 11 so that the lower flanges 50 are positioned below the bucket bead 16 which fits in the grooves 48 in the brackets 36. Consequently, each bracket 36 is located in a fixed position on the bucket 11 at a location straddling a frame projection 22. The bumper 30 is assembled with the brackets so that it engages the undersides of the top bracket flanges 54, which thus function to positively locate the bumper member 30 on the bucket 11. As best appears in Fig. 2, when the bumper 30 is extended about the four brackets 36 on the bucket 11, it is of a non-circular closed loop shape somewhat resembling a square with rounded corners represented by the brackets 36. This shape is the result of the forming of the bracket surfaces 40 so that they are more sharply curved than the inner surfaces 38. As a result, the bumper 30 engages the bucket 11 at positions between the brackets 36, is easier to install on the brackets 36 and is less likely to be accidentally knocked off the bucket 11. In addition, the formation of each bracket 36 of an increased thickness at the center portion which is above a caster wheel 24 insures a location of the bumper 30 in which it projects outwardly beyond the wheel 24 at all times.

It will be understood that the specific construction of the improved bucket and bumper assembly herein disclosed and described is presented for purposes of ex-

What is claimed is:

1. In combination with a bucket having a tubular side wall and a bottom wall secured to said side wall at a bead, a frame secured to the lower end of said bucket, a plurality of projections on said frame disposed outwardly of said bead for mounting wheels on said frame, a plurality of bumper supporting brackets, each of said brackets being arranged in a straddling relation with one of said projections and having a bead receiving groove on the inner side thereof, each of said brackets having an inner surface conforming to the curvature of said bucket side wall and an outer surface which is of a reduced radius of curvature relative to said inner surface, first flange means on each bracket extending inwardly of said bucket at the lower side of said bead, second flange means on each bracket extending outwardly adjacent the top side thereof, and a resilient bumper member extending horizontally about said brackets and said bucket at a position engaging the underside of said second flange means.

2. In combination with a bucket having a tubular side wall and a bottom wall secured to said side wall at a bead which extends radially outwardly of said bottom wall, a supporting frame secured to the lower end of said bucket, a plurality of projections on said frame disposed outwardly of said bead for mounting wheels on said frame, a plurality of bumper supporting brackets, each of said brackets being arranged in a straddling arrangement with one of said projections and having a bead receiving groove on the inner side thereof, first flange means on each bracket extending inwardly of said bucket at the lower side of said bead, second flange means on each bracket extending outwardly adjacent the top side thereof, and a resilient bumper member extending horizontally about said brackets and said bucket at a position engaging the lower side of said second flange means.

3. In combination with a bucket supported on wheels and having a tubular side wall, four bumper-supporting brackets mounted at substantially equally spaced positions on the bucket side wall adjacent the lower end thereof and in a substantially horizontal plane, each of said brackets having a curved outer surface which is of a reduced radius of curvature relative to said bucket side wall, and a resilient bumper member extending horizontally about said bracket outer surfaces and said bucket and being under tension for maintaining the brackets on said bucket and for frictionally maintaining said bumper on said brackets, each of said brackets having a flange at the lower end thereof extending under and engaged with the bottom end of said bucket.

References Cited in the file of this patent

UNITED STATES PATENTS

| | | |
|---|---|---|
| 2,531,131 | Johnson | Nov. 21, 1950 |
| 2,573,085 | Youkers | Oct. 30, 1951 |
| 2,665,922 | Bard | Jan. 12, 1954 |
| 2,840,384 | Bard | June 24, 1958 |

OTHER REFERENCES

Publication: The Colson Corporation, Elyria, Ohio, Catalog No. L–292, pages 29, 37, 52, 53; coprighted 1945.